Sept. 18, 1923.
A. E. KIVIKINK ET AL
ANTIGLARE SCREEN FOR AUTOMOBILES
Filed March 17, 1921
1,468,115
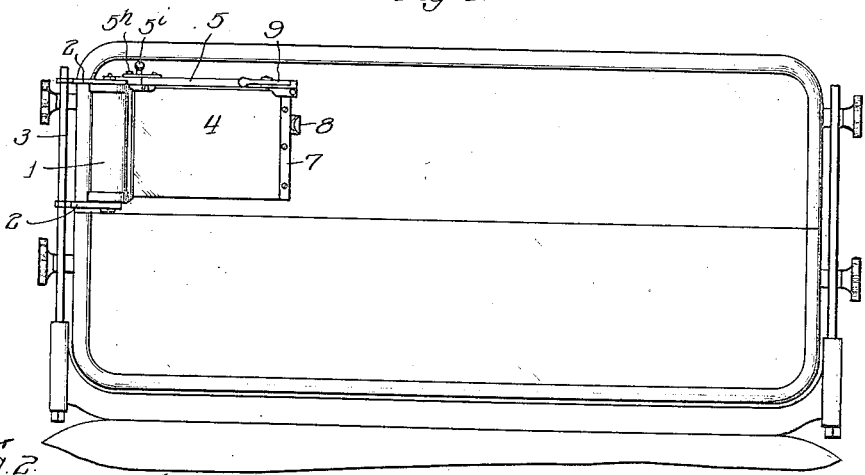
Witness:
R. Burkhardt
Inventors:
August E. Kivikink
and Emil Nelson,
By Wilkinson, Husley, Byron & Knight
Attys Patented Sept. 18, 1923.

1,468,115

UNITED STATES PATENT OFFICE.

AUGUST E. KIVIKINK AND EMIL NILSON, OF INDIANA HARBOR, INDIANA.

ANTIGLARE SCREEN FOR AUTOMOBILES.

Application filed March 17, 1921. Serial No. 452,985.

*To all whom it may concern:*

Be it known that we, AUGUST E. KIVIKINK, a citizen of the United States, and EMIL NILSON, formerly a subject of the King of Sweden, but who has made application for citizenship of the United States and has received his first papers therefor, residing at Indiana Harbor, in the county of Lake and State of Indiana, have invented certain new and useful Improvements in Antiglare Screens for Automobiles, of which the following is a specification.

This invention relates to a screen in the form of a curtain to be introduced in the line of vision of the driver of a motor vehicle for the purpose of tempering the glare of lights from an approaching vehicle without obscuring the driver's view of the roadway, and has for its object to provide such a screen with a housing containing improved means for automatically retiring its curtain from position of use when the need for it has ended, and for storing the retired curtain within convenient reach for immediate use when needed; also for sustaining the curtain from the housing independently of confining means, such as the windshield of a vehicle, when the curtain is drawn to position of use, and insuring the curtain against injurious vibration when in such position, and thus admitting of the employment of relatively light flexible material for the curtain, for instance, celluloid; means for releasably detaining the curtain in its drawn position, and means for retiring the sustaining means from its sustaining position, and therefore out of obstructing position, being also employed.

In carrying out the invention, a housing is employed with means for attaching it to any convenient part of the car, and a spring roller is mounted within the housing for storing the curtain when released and paying it out again when drawn to position of use. A track is extended rigidly and in fixed direction from said housing to define the path of travel of the curtain, and a perpendicular stiffening arm which embraces the forward edge of the curtain is slidingly but rigidly articulated with the track so as to suspend the outer end of the curtain, confine it to its normal plane when drawn, and resist injurious vibration while in use. The device is thus rendered self sustaining independently of the windshield of the vehicle or other confining wall, and may be used even when the windshield is open. The track carries a releasable detent that holds the curtain in drawn position against the spring of the winding roller, and the track is jointed to permit that portion thereof lying beyond the retracted position on the stiffening arm to fold down out of obstructing position when not in use.

In the accompanying drawing—

Figure 1 is a rear elevation of the windshield of a motor vehicle having a screen embodying the subject-matter of the present invention mounted on the fixed frame thereof and drawn to position of use.

Figure 2 is a view on an enlarged scale of the curtain detached and in retracted position, the casing and rolling mechanism being in section.

Figure 3 is a plan view of the same with the guide rail in position of use, and its outer end in longitudinal section.

Figures 4 and 5 are sections taken, respectively, on the lines $4^x$—$4^x$ and $5^x$—$5^x$ of Figure 2; and Figure 6 is a section on the line $6^x$—$6^x$ of Figure 3.

1 represents the housing equipped with brackets 2 adapting it for mounting on any convenient portion of a motor vehicle, for instance, the fixed portion of a windshield frame 3. 4 represents the curtain to be stored within the housing 1 when not in use, or to be paid out therefrom when drawn to position of use. This curtain is of any material suitable for tempering or diminishing the glare of light without obscuring the driver's view of the roadway. Transparent colored celluloid is preferably used for this purpose. The dimensions of the curtain are such as to afford an ample field of screened vision without extending to an objectionable degree beyond such field.

To adapt the housing 1 to serve the function stated, it is preferably provided with a winding roller $1^a$ to which the inner mounting of the curtain is attached through means of attaching tangs $1^{ax}$. Roller $1^a$ has bearing heads $1^b$, $1^c$ through which it is journaled on the stationary central tie rod $1^d$, and a spring $1^e$ in driving connection with the roller at $1^x$ and in anchoring connection with a core $1^g$ on the stationary rod $1^d$ through the medium of the screw $1^h$ which passes through the core and impinges the rod.

To sustain the curtain 4 in a fixed plane and in a definite direction from the housing 1, a track 5 is mounted upon the housing 1, and preferably consists of a tubular rail having a downwardly presented slot to receive a runner 6 fitted therein, which carries a depending stiffening arm 7 clamped upon the forward edge of the curtain. Runner 6 is fitted within the tubular track 5 so that it can neither tip in the plane of the curtain nor swing transversely to said plane, and it thus serves as means for not only suspending the curtain vertically but for keeping it taut in drawn position, and sustaining it against transverse vibration independently of the windshield or other attaching means. Stiffening arm 7 may also serve as a means for drawing the curtain 4 from the housing 1, for which purpose it is provided with the handle 8.

9 represents a detent pivoted at 10 near the outer end of the track 5, and having a bolt 9ª adapted to snap into a recess in the runner 6 and retain the curtain in drawn position and against tension of the spring 1ᵉ. With this means of detention it is simply necessary to draw the curtain suddenly outward until the runner 6 is arrested at the end of the track, for instance, by means of the cross pin 5ª, Figure 3, and when it is desired to retire the curtain from position of use it is merely necessary to press the inner end of the lever of detent 9 to permit the roller 1ª to retire the curtain within the housing.

It may be desirable to retire the track 5 from the driver's field of vision when the device is not in use, and to permit this to be done, track 5 is subdivided into inner member 5ᵇ and outer member 5ᶜ hinged together at 5ᵈ, so that the outer member is adapted to drop into folding position, as illustrated in Figure 2. To sustain the member 5ᶜ in position of use, any suitable form of latch may be used, for instance, the splice bar 5ᵉ pivoted on one member at 5ᶠ, and having a slotted end 5ᵍ through which it is adapted to engage the headed stud 5ʰ on the other member and swing into proper position through the medium of the handle 5ⁱ.

A screen constructed as described may be mounted upon the frame of the windshield of an automobile or upon the corner post or other convenient part of a closed type of vehicle body, and may be called into instant use when needed, and conveniently retired from use when not needed.

We claim:

In combination, the windshield supports of an automobile, an anti-glare screen comprising a curtain and a housing for housing said curtain, said housing being mounted upon one of said windshield supports, said housing being provided with a single track extending laterally of said windshield supports, said track being hinged to said housing whereby said track may be folded into parallelism with said housing, said curtain being provided with a stiffening end piece having non-tipping articulation with said track, said track being adapted to guide said curtain in its movement between a screening position and a position within said housing, said curtain being spring-retracted, and a readily operable detent co-operating with said track for holding said curtain in screening position but permitting said curtain, when said detent is released, to rapidly pass to a position within said housing.

Signed at Indiana Harbor, Indiana, this 10th day of March, 1921.

AUGUST E. KIVIKINK.
EMIL NILSON.